United States Patent
Engdahl (10) Patent No.: US 7,035,215 B1
(45) Date of Patent: *Apr. 25, 2006

(54) METHOD FOR SYNCHRONIZATION ADAPTATION OF ASYNCHRONOUS DIGITAL DATA STREAMS

(75) Inventor: Tomi Engdahl, Espoo (FI)

(73) Assignee: Nokia Corporation, Espoo (FI)

( * ) Notice: Subject to any disclaimer, the term of this patent is extended or adjusted under 35 U.S.C. 154(b) by 988 days.

This patent is subject to a terminal disclaimer.

(21) Appl. No.: 09/608,667

(22) Filed: Jun. 30, 2000

Related U.S. Application Data (63) Continuation of application No. PCT/EP98/00006, filed on Jan. 2, 1998.

(51) Int. Cl.
*H04J 1/16* (2006.01)
*H04J 3/16* (2006.01)

(52) U.S. Cl. .................. 370/235; 370/412; 370/465

(58) Field of Classification Search ............... 370/235, 370/412, 465
See application file for complete search history.

(56) References Cited

U.S. PATENT DOCUMENTS

| | | | |
|---|---|---|---|
| 4,897,855 A * | 1/1990 | Acampora | 375/245 |
| 5,228,028 A * | 7/1993 | Cucchi et al. | 370/392 |
| 5,594,729 A * | 1/1997 | Kanakia et al. | 370/395.1 |
| 5,737,313 A * | 4/1998 | Kolarov et al. | 370/236 |
| 5,757,668 A * | 5/1998 | Zhu | 375/240.16 |
| 6,226,758 B1 * | 5/2001 | Gaalaas et al. | 713/600 |
| 6,243,497 B1 * | 6/2001 | Chiang et al. | 382/251 |
| 6,269,078 B1 * | 7/2001 | Lakshman et al. | 370/230 |
| 6,288,794 B1 * | 9/2001 | Honary | 358/1.2 |
| 6,310,857 B1 * | 10/2001 | Duffield et al. | 370/232 |
| 6,496,607 B1 * | 12/2002 | Krishnamurthy et al. | 382/282 |
| 6,876,666 B1 * | 4/2005 | Engdahl | 370/466 |

FOREIGN PATENT DOCUMENTS

| | | |
|---|---|---|
| EP | 0 689 318 | 12/1995 |
| WO | 95/22233 | 8/1995 |
| WO | 95/333320 | 12/1995 |

OTHER PUBLICATIONS

"Three-Level Traffic Shaper and Its Application to Source Clock Frequency Recovery for VBR Video Services in ATM Networks" Kim, IEEE/ACM Transactions on Networking, Aug. 1995, No. 4.

* cited by examiner

*Primary Examiner*—Andy Lee
(74) *Attorney, Agent, or Firm*—Squire, Sanders & Dempsey LLP (57) ABSTRACT

The present invention proposes a method for synchronization adaptation of asynchronous digital data streams comprising the steps of providing a first digital data stream (PCM_IN) at a first sample rate (CLK_1); inputting said first digital data stream (PCM_IN) to a sample rate conversion means (SRC); supplying data output from said sample rate conversion means (SRC) to a processing element (BUFFER); storing said supplied data into said processing element (BUFFER); and outputting said data stored in said processing element as a second digital data stream (PCM_OUT) at a second sample rate (CLK_2), with said first and said second sample rates (CLK_1, CLK_2) being different from each other; and is characterized by the further steps of detecting a state (BUFFER_STATUS) of said processing element (BUFFER); and controlling said sample rate conversion means (SRC) dependent on the detected state of said processing element. The present invention also proposes a device for synchronization adaptation of asynchronous digital data streams, operating according to such a method.

6 Claims, 7 Drawing Sheets

METHOD FOR SYNCHRONIZATION ADAPTATION OF ASYNCHRONOUS DIGITAL DATA STREAMS

This application is a continuation of international application Ser. No. PCT/FR98/00006, filed 2 Jan. 1998.

FIELD OF THE INVENTION

The present invention relates to a method for synchronization adaptation of asynchronous digital data streams such as asynchronous PCM audio streams. In particular, the present invention relates to a method for moving data between two autonomously clocked PCM audio streams connected through a network operating in an asynchronous transmission mode (hereinafter referred to as ATM network).

BACKGROUND OF THE INVENTION

Generally, in an ATM network a plurality of digital data streams $S_1, \ldots, S_n$ having different bit rates $R_1, \ldots, R_n$, respectively, (or at least one data stream having a certain bit rate) are input to a signal processing element SPE, and are output to a transmission path T operated at a further different bit rate $R_T$.

For transmission via the transmission path T, the respective input data streams $S_1, \ldots, S_n$ are "cut" or separated by the signal processing element SPE into a respective plurality of so-called ATM cells $C_{S1i}, \ldots, C_{Snk}$ of a predetermined length including cell identifier codes as well as the respective information to be transmitted. The thus obtained ATM cells $C_{S1i}, \ldots, C_{Snk}$ are temporarily stored or buffered in a buffer memory BUF_MEM and output to the single transmission path T operated at the specified bit rate $R_T$. Within the output data stream, the respective ATM cells are alternately transmitted according to the amount of data to be transmitted in the corresponding data streams $S_1, \ldots, S_n$, while in case that no information is to be transmitted, a so-called empty-cell or blank cell (containing no information) is inserted in the transmitted stream or ATM-cells.

Figure 1:
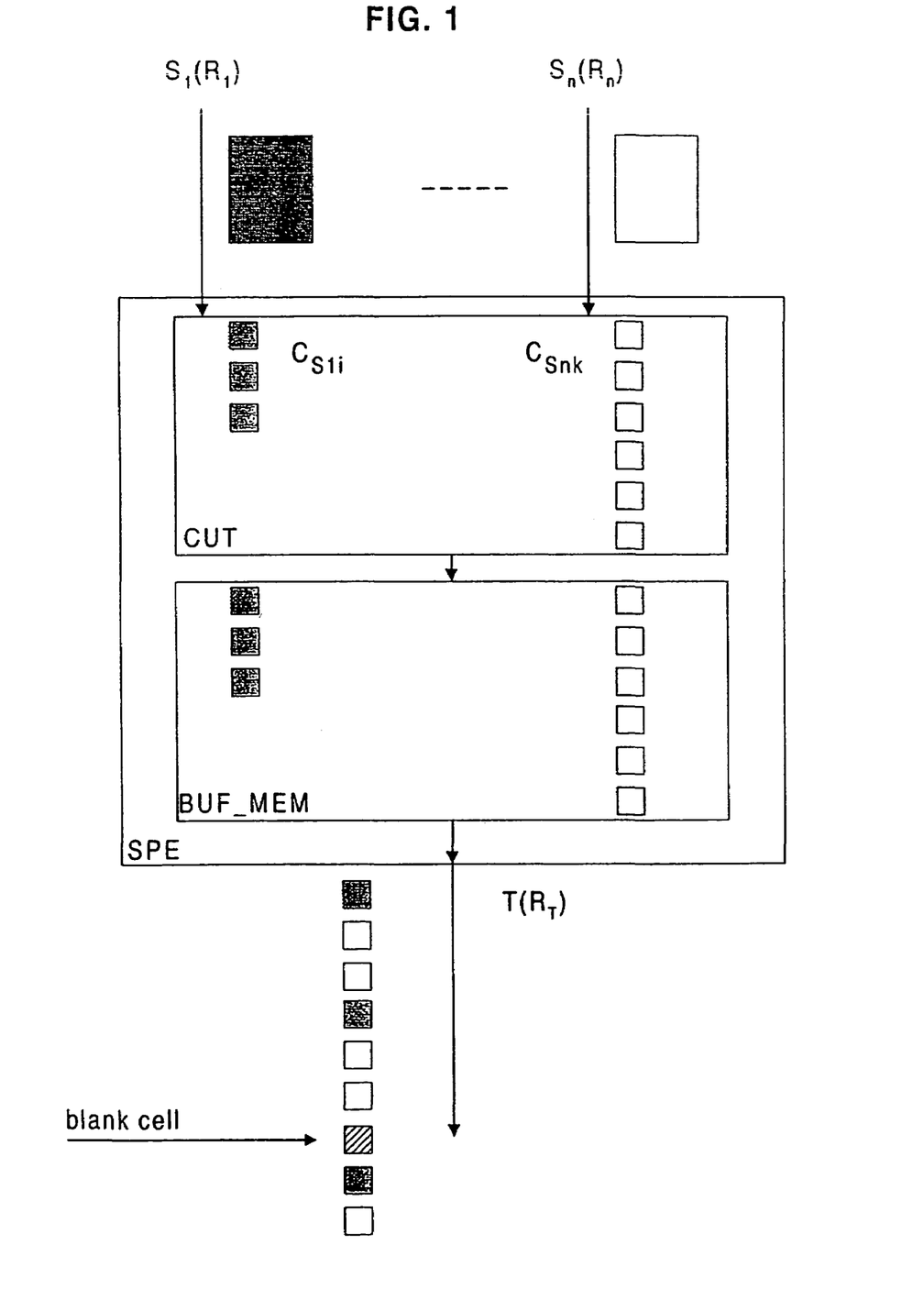
FIG. 1 shows the principle of ATM transmission with reference to the transmitter side.

This principle of ATM transmission as briefly explained above is illustrated in FIG. 1. However, FIG. 1 illustrates the transmitter side only, and a corresponding ("reverted") signal processing has to be conducted at the receiver side. That is, at the receiver side, the received data stream of ATM cells has to be buffered and the ATM cells are rejoined to thereby reconstruct the respective individual data streams on the basis of the cell identifier codes of the respective ATM cells.

Recently, with the increasing progress in development of mobile communication, in addition to the mere "telephone" feature providing for transmission of audio data, i.e. pulse code modulated (PCM) speech data, an increased customer demand for various other services like information services has developed, which services are also commonly referred to as "value added services". The information respectively provided by such services, however, has to be transmitted at different bit rates depending on the bandwidth required for the transmission of the respective information. Therefore, lately developments also implement the principle of ATM in connection with mobile communication according to the present status of GSM system as an example for a telecommunication system.

Figure 2:
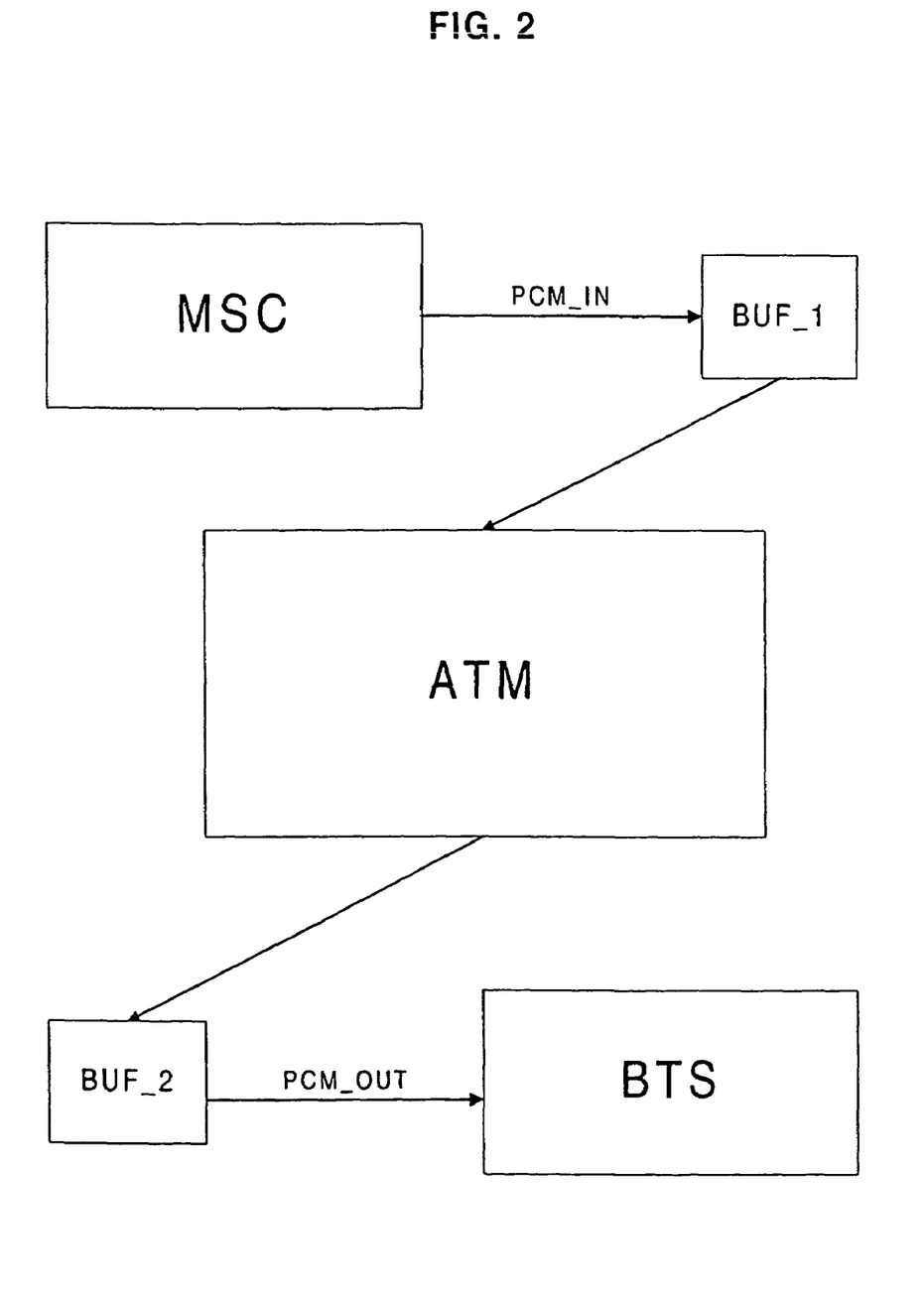
FIG. 2 shows an implementation of an ATM link within a GSM network.

FIG. 2 shows a simplified block diagram of an ATM link implemented in a GSM system with the indicated signal transmission direction being depicted for the downlink direction. That is, data output from a mobile switching center MSC via the corresponding MSC interface are transmitted via a PCM link (transmitting for example digital pulse code modulated speech data and being illustrated as a bold arrow) to an associated buffer Memory BUF_1. It is to be noted that this buffer memory also effects the conversion of the data received via the PCM link into ATM cells and vice versa (depending on the current signal transmission direction, i.e. uplink or downlink) and thus fulfills the function of the signal processing element SPE explained above with reference to FIG. 1. From the buffer memory BUF_1, the data are transmitted via an ATM link to a receiving side buffer memory BUF_2, which processes the received ATM cells such that the data can be transmitted via an output PCM link and a base transceiver station interface to a base transceiver station BTS. Due to the presence of the ATM link, a need for two buffers (buffer memories) arises.

However, since the clock sources of the two PCM links associated to the mobile switching center MSC and the base transceiver station BTS, respectively, are not synchronized at all (the ATM link does not provide for any synchronization), there exists a difference in the clock frequencies of those PCM links. This clock difference (i.e. difference in sampling rate) will cause a buffer overflow or underflow because the data is not leaving the buffer at the same speed it arrives at the buffer.

For the sake of simplification of the further explanations, however, those two buffers connected to each other with an ATM link may be regarded as constituting a single signal processing element or buffer, respectively, which processing element connects two different PCM links PCM_IN and PCM_OUT. This model is shown in FIG. 3A of the drawings.

Figure 3A:
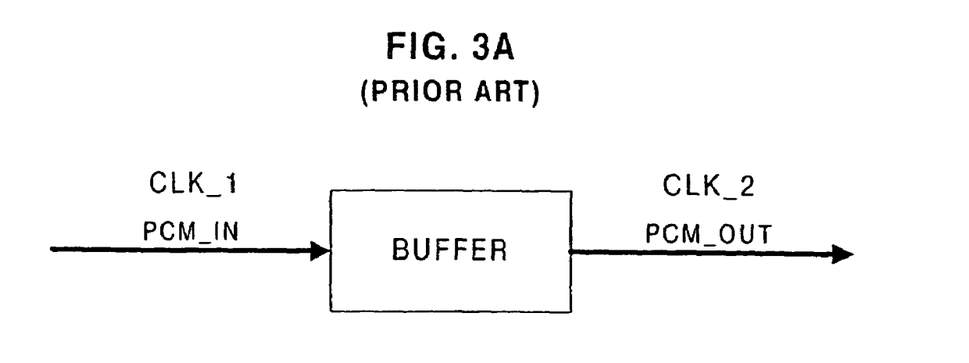
FIG. 3A shows a conventional arrangement of two digital data streams (PCM audio streams) with respective autonomous clocks, being connected to a single signal processing element.

FIG. 3A depicts the situation of two separately, i.e. autonomously clocked PCM data streams clocked with sample rates CLK_1 and CLK_2, respectively, which are not synchronized at all, being connected to a single signal processing element or buffer, respectively. As briefly explained above, the PCM data streams (e.g. audio data streams) are independently clocked in such a way that the clock rates are not exactly the same. Consequently, after a certain time of operation, the buffer gets filled up when the output clock rate CLK_2 of the data stream PCM_OUT is lower than the input clock rate CLK_1 of the data stream PCM_IN. When the output clock rate CLK_2 of the data stream PCM_OUT is faster than the input clock rate CLK_1 of the data stream PCM_IN, the buffer runs out of data after a certain time, i.e. the buffer will become empty.

Stated in other words, as a result of the clock frequency difference between the clock rates CLK_1 and CLK_2, buffering problems such as overflow or underflow of the buffer will occur.

In case of overflow, new data arriving at the buffer will not be stored in the buffer and are therefore lost, resulting in a drawback that information is transmitted incomplete. In case of underflow, temporarily no data are available for transmission to the receiver side, so that the data transmission as viewed from the receiver side will be temporarily interrupted.

In any case, even if the clock rates CLK_1, CLK_2 are almost the same and differ only slightly from one another, the above described problems still exist, although they will manifest only very rarely.

A prior art solution used in many practical systems resides in taking not too much care of such overflow and underflow situations. That is, as mentioned above, in a situation of buffer overflow the samples which exceed the available buffer storage capacity are just simply discarded. In a situation of buffer underflow, when additional samples are needed in order for the transmission being not interrupted, so called dummy samples are generated, which dummy samples represent, for example, a silent value in case of speech transmission. Such an approach is easy to implement but causes noticeable clicks to the transmitted sound signals. This approach, however, is mainly used as a safety feature in synchronized systems for assuring that in case the synchronization does not work, data are still transmitted through the system until it is synchronized again.

Figure 3B:
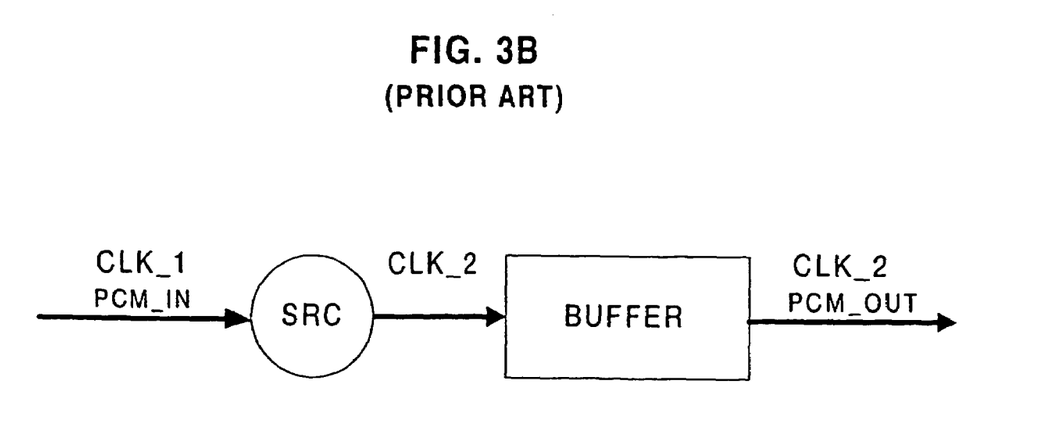
FIG. 3B shows a further conventional arrangement including a sample rate converter for synchronization adaptation of two asynchronous digital data streams being connected to the signal processing element (buffer)

A further conventionally known possibility to remove the overflow/underflow problem was to add a sample rate converter SRC at the input side of the buffer which resamples the input PCM data (or audio data, respectively,) to thereby adapt the input sample rate (or clock rate) CLK_1 to the output sample rate CLK_2. FIG. 3B shows a schematic block diagram depicting such an earlier solution for a PCM—PCM sample rate adaptation.

However, this prior art solution has drawbacks such that an enormous amount of signal processing was required, which due to the data modification, to a certain extent, also influenced sound quality of a transmitted PCM audio stream. In general, it has to be expected that such a solution will adversely affect the quality of transmitted digital signals.

SUMMARY OF THE INVENTION

It is therefore an object of the present invention to provide a method and device for synchronization adaptation of asynchronous digital data streams which is free from the above drawbacks. In particular, the present invention aims to provide such a method and device which performs less signal processing while also maintaining the transmission quality, i.e. sound quality in case of transmission of PCM audio signals.

According to the present invention, this object is achieved by a method for synchronization adaptation of asynchronous digital data streams comprising the steps of providing a first digital data stream at a first sample rate; inputting said first digital data stream to a sample rate conversion means; supplying data output from said sample rate conversion means to a processing element; storing said supplied data into said processing element; and outputting said data stored in said processing element as a second digital data stream at a second sample rate, with said first and said second sample rates being different from each other; characterized by the further steps of detecting a state of said processing element; and controlling said sample rate conversion means dependent on the detected state of said processing element.

Moreover, according to the present invention, this object is achieved by a device for synchronization adaptation of asynchronous digital data streams comprising a sample rate conversion means to which is input a first digital data stream at a first sample rate; a processing element for storing data output from said sample rate conversion means, and for outputting said data stored in said processing element as a second digital data stream at a second sample rate, with said first and said second sample rates being different from each other; characterized by a detection means for detecting a state of said processing element; and a control means for controlling said sample rate conversion means dependent on the detected state of said processing element.

Thus, the method and device according to the present invention has the advantages that a need for massive signal processing is removed, while the data transmission quality is maintained at a high level.

Advantageous further developments of the present invention are as set out in the dependent claims.

BRIEF DESCRIPTION OF THE DRAWINGS

In the following, the invention will be described in greater detail by way of example with reference to the accompanying drawings in which:

FIG. 7A shows a schematic block diagram for filtering samples in case the data stream of samples is to be reduced in the number of samples; while

DESCRIPTION OF PREFERRED EMBODIMENTS

Preferred embodiments of the present invention are described herein below in detail with reference to the drawings.

In particular, the present invention makes use of the fact that the sample rates or clock rates at the transmitted input and output digital data streams (PCM audio streams) CLK_1, CLK_2 are almost identical, so that modifications in the transmitted data may be reduced significantly. Based thereon, the present invention starts from the idea to continue without modifying the transmitted data until the buffer starts to be filled up, i.e. is nearly full, or starts to run out of data too much, i.e. is nearly empty. When either one of the above indicated situations occurs, the sample rate converter SRC is initiated to modify the data. That is, as long as none of the above described "nearly full" or "nearly empty" situations is present, the sample rate converter SRC is inactive (idle) and passes input data PCM_IN unchanged to its output. The output of the sample rate converter is only modified in case one of the above mentioned two situations is detected, in response to which detection the sample rate converter SRC is rendered operative. Stated in other words, in order to carry out the above described control of the sample rate converter, a feedback control loop from the buffer to the sample rate converter is implemented.

Figure 4:
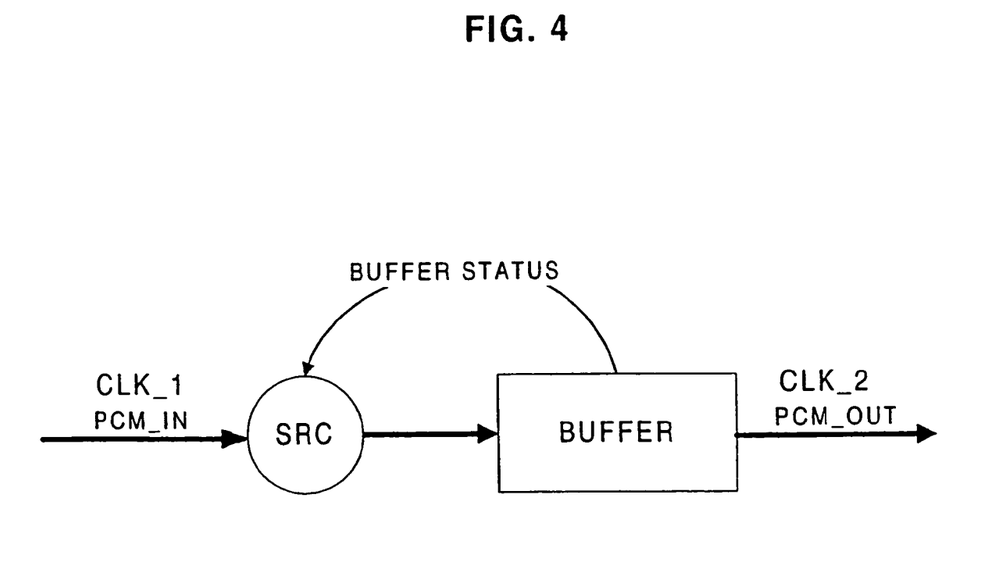
FIG. 4 illustrates a block diagram of a first embodiment of the present invention.

FIG. 4 illustrates a first embodiment of the present invention implementing such a feedback control loop for controlling the sample rate converter SRC.

As shown in FIG. 4, a first digital data stream PCM_IN consisting of e.g. PCM audio data, being transmitted at a first sample rate CLK_1, is supplied to a sample rate converter SRC, and an output of the sample rate converter is connected to a buffer as a signal processing element to thereby supply data output from said sample rate converter SRC to said buffer for being temporarily stored therein. Further, after being temporarily stored in the buffer, the stored data are output as a second digital data stream PCM_OUT being transmitted at a second sample rate CLK_2, with the second sample rate (clock rate) CLK_2 being different from the first sample rate CLK_1.

Insofar, the arrangement shown in FIG. 4 is similar to the one described herein above in connection with FIG. 3B. The main difference between the prior art arrangement depicted in FIG. 3B and the first embodiment of the present invention as shown in FIG. 4 resides in the fact that, according to the present invention, the sample rate converter SRC is rendered operative on demand only.

That is, in the arrangement according to FIG. 3B, all input data PCM_IN are subjected to continuous sample rate conversion, irrespective of whether it is required or not, i.e. whether buffering problems were present and/or expected to occur or not, thus leading to an increased signal processing load for the system.

In contrast thereto, according to the present invention data transmission continues without modifying the transmitted data in terms of the sample rate until the buffer starts to be filled up, i.e. is nearly full, or starts to run out of data too much, i.e. is nearly empty. When either one of the above indicated situations occurs, the sample rate converter SRC is initiated to modify the sample rate of the data, thereby hardly influencing the data as such or at least to a very small extent only, which assures a high signal transmission quality (the sound quality in case of PCM audio data being transmitted).

The control of the sample rate converter SRC is achieved by a control means (not shown) based on a control signal BUFFER_STATUS indicating the status of the buffer, i.e. whether the buffer is nearly full or nearly empty. The control signal BUFFER_STATUS is detected by a detection means (not shown) and is variable over time t depending on the amount of data currently stored in the buffer. According to the respective current value of this signal BUFFER_STATUS the sample rate converter SRC is disabled or enabled, thereby switching between outputting the input digital signal PCM_IN unchanged with regard to the sample rate CLK_1 or modified with regard to the sample rate.

In the following, the generation of the BUFFER_STATUS signal as the signal indicating the buffer status is explained with reference to FIG. 5.

Figure 5:
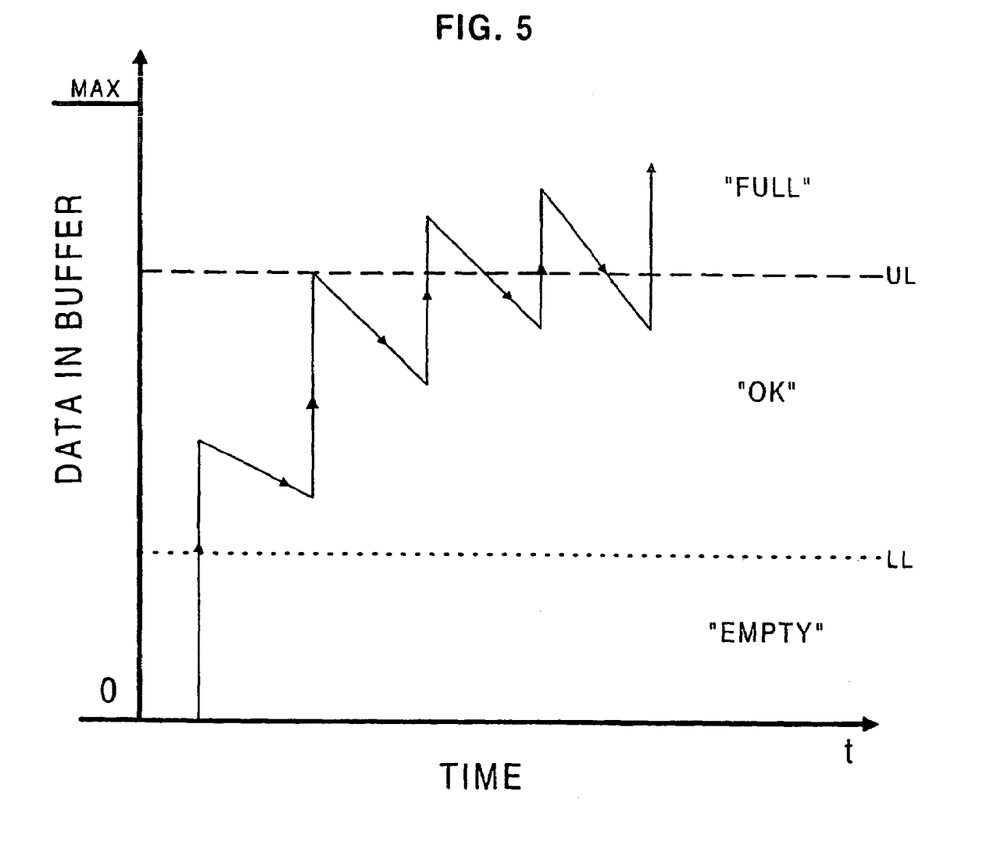
FIG. 5 depicts a graph exemplifying how the buffer status is obtained dependent from the amount of data temporarily stored in the buffer.

FIG. 5 is a graph exemplifying the change of the amount of data stored in the buffer as a function of the lapse of time t. At the beginning of data transmission, the buffer is assumed to be empty. In the course of data transmission the buffer is being filled corresponding to the sample rate at the buffer input side (first sample rate) CLK_1, while simultaneously the buffer is being read out corresponding to the sample rate at the buffer output side (second sample rate) CLK_2.

During this data write/read process, the detection means (not shown) associated to the buffer monitors the status of the buffer, i.e. detects whether the buffer is nearly full or nearly empty. The detection of these buffer states is achieved by evaluating the amount of data stored in the buffer. That is, the detection means compares the currently stored amount of data in the buffer with an upper limit UL and with a lower limit LL of stored data amount.

In case the amount of stored data exceeds the (predetermined) upper limit UL, the detection means generates a status information informing that the buffer is becoming too full and/or is nearly full and sets the buffer status signal BUFFER_STATUS to a corresponding first value, thereby rendering the sample rate converter SRC operative to reduce the amount of data to be stored in the buffer, thereby preventing a buffer overflow accompanied by a loss of further incoming data.

In case the amount of stored data falls below the (predetermined) lower limit LL, the detection means generates a status information informing that the buffer is becoming too empty and/or is nearly empty and sets the buffer status signal BUFFER_STATUS to a corresponding second value, thereby rendering the sample rate converter SRC operative to increase the amount of data to be stored in the buffer, thereby preventing the buffer from becoming empty and preventing the transmission from being interrupted.

In case the detected amount of data is found to be between the lower limit LL and the upper limit UL, the detection means sets the signal BUFFER_STATUS to a corresponding third value rendering the sample rate converter SRC inoperative to thereby merely pass the input data PCM_IN unchanged in terms of their sample rate CLK_1 to the buffer. The above described different buffer states represented by the first through third values of the signal BUFFER_STATUS are labeled in FIG. 5 as "Full", "Empty", and "OK" state, respectively.

The values for the predetermined upper and lower limit may be defined according to the specific application. These limits UL, LL set the values for maximum and minimum delays which the buffer causes to the system. Those should be set such that normal network delay variations do not start the resampling. The limits should be set such that network variations, i.e. variations in the processing speed of the network, do not cause the buffer becoming empty or do not cause a buffer overflow. This means that a sufficient safety marginal from the upper limit UL to the possible maximum amount of stored data MAX (determined by the buffer memory capacity) should be set, while also the lower limit LL should be set sufficiently high above the situation in which the buffer is empty.

In particular, it has to be noted that the amount of data temporarily stored in the buffer is directly proportional to the delay the (transmission) system causes. That is, the more memory capacity the buffer has, the better the system works. However, the more memory capacity is used, the longer are the delays caused. Such long delays are problematic in connection with transmission of voice signals (PCM audio data) and there exists a requirement that the delay in connection with the buffer should be less than 100 ms. Assuming a sound sample rate of 8 kHz, this results in a restriction for the buffer such that 800 sample values are permissible at a maximum. Therefore, in case the maximum delay of 100 ms is acceptable for a specific application, the maximum memory capacity MAX of the buffer may be selected to be slightly larger than one corresponding to 800 samples, while the upper limit UL may be set to a value corresponding to 800 samples stored in the buffer. In cases in which the admissible delay is required to be smaller, the upper limit UL may be set to a lower value, while in order to avoid a waste of unused buffer memory capacity, also the buffer memory capacity MAX may be lowered accordingly.

On the other hand, the buffer capacity or buffer lengths, respectively, is defined under consideration of the fact that the buffer must be able to handle network delay variations. Consequently, the buffer capacity has to be set to such a value that more data than the data amount delayed during the network delay are buffered therein. Stated in other words, the data amount stored in the buffer is required to be large enough that data can continuously be read out therefrom during the network delay. Network delay variations occurring in ATM networks are caused by ATM switch buffers (and in CBR service [CBR=constant bit rate] typically correspond to 100–200 cells). Therefore, typical delay variations at a 155 Mbit/s ATM link through one ATM switch are in the range of below 2 ms. This value is obtained when assuming a delay of 200 ATM cells, each cell comprising 160 samples in 8 bit representation (non-linear presentation according to A-law coding having the same dynamics as 13 bit linear system) being transmitted via a 155 Mbit/s ATM link using the equation $$delay(ms)=(number\_of\_cells*160\ samples*8\ bit)/155\ Mbit/s$$

which delay variations will add up when the transmitted data pass more than one ATM switch.

At a sound sample rate of 8 kHz, a delay of 2 ms corresponds to 16 samples to be buffered. Therefore, dependent on the number of ATM switches the data passes, the lower limit LL should be set to a value corresponding to the multiple of the number of ATM switches to be passed and the data amount of 16 samples, in order that an underflow may not occur in the buffer due to network variations.

Although specific numeric values for the limits UL, LL, and the buffer memory capacity MAX have been given herein above, it has to be noted that these are only intended for illustrating the principles of determination of buffer capacity MAX and setting of upper and lower limits UL, LL and are mere examples. In particular, those values may vary depending on specific application parameters.

In the foregoing, the determination of the buffer status signal has been described, which status signal controls the operation state of the sample rate converter. In the following, the respective operation modes of the sample rate converter are described in more detail.

In case the buffer starts to be filled up and the "Full" state is detected (the amount of data stored in the buffer exceeds the upper limit UL), the sample rate converter SRC is rendered operative in order to reduce the amount of data to be stored in the buffer until normal operation values are reached again, i.e. until the "OK" state is detected again when the amount of data stored in the buffer falls below the upper limit UL again. In this sample rate converter operation state, one or more samples are removed from the incoming stream PCM_IN of digital data to thereby perform a "thinning out" of the data. Alternatively, FIR filtering (Finite Impulse Response Filtering) may be used for data reduction, according to which method a suitable interpolation may be performed to obtain, for example, two new data samples out of three input samples of data. An example of such filtering is explained herein below with reference to FIG. 7A.

In case the buffer starts to run out of data and the "Empty" state is detected (the amount of data stored in the buffer falls below the lower limit LL), the sample rate converter SRC is rendered operative in order to increase the amount of data to be stored in the buffer until normal operation values are reached again, i.e. until the "OK" state is detected again when the amount of data stored in the buffer exceeds the lower limit LL again. In this sample rate converter operation state, one or more samples are added to the incoming stream of digital data to thereby expand the data, thus preventing the buffer from actually becoming empty. To this end, at least some of incoming data samples may simply be duplicated. Alternatively, new data samples may be obtained, for example, by interpolating an additional data sample between two subsequent incoming data samples using an FIR filter. An example of such filtering is explained herein below with reference to FIG. 7B.

Figure 7A:
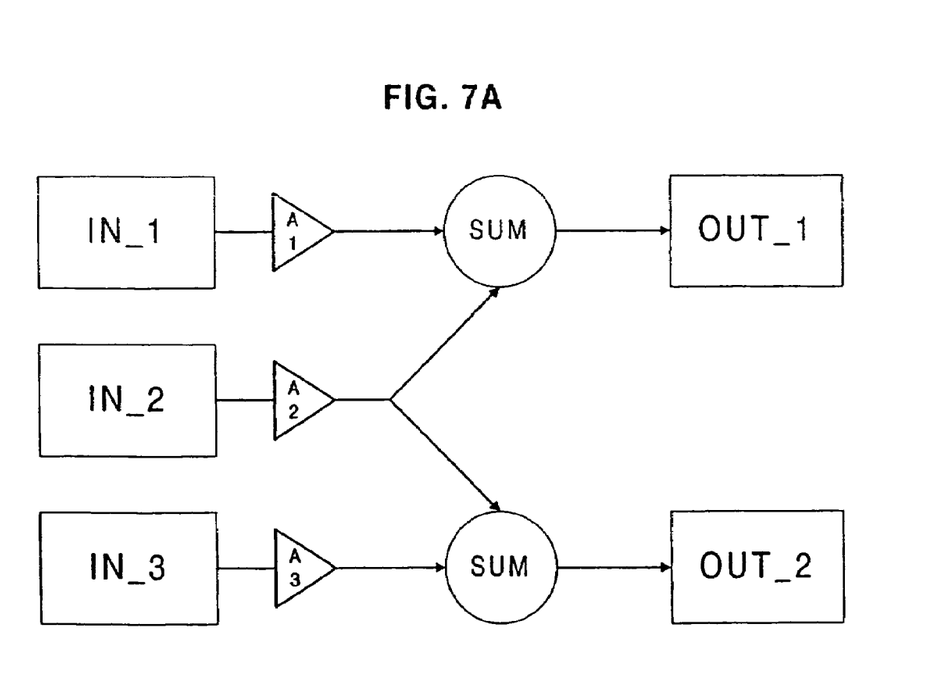
Figure 7B:
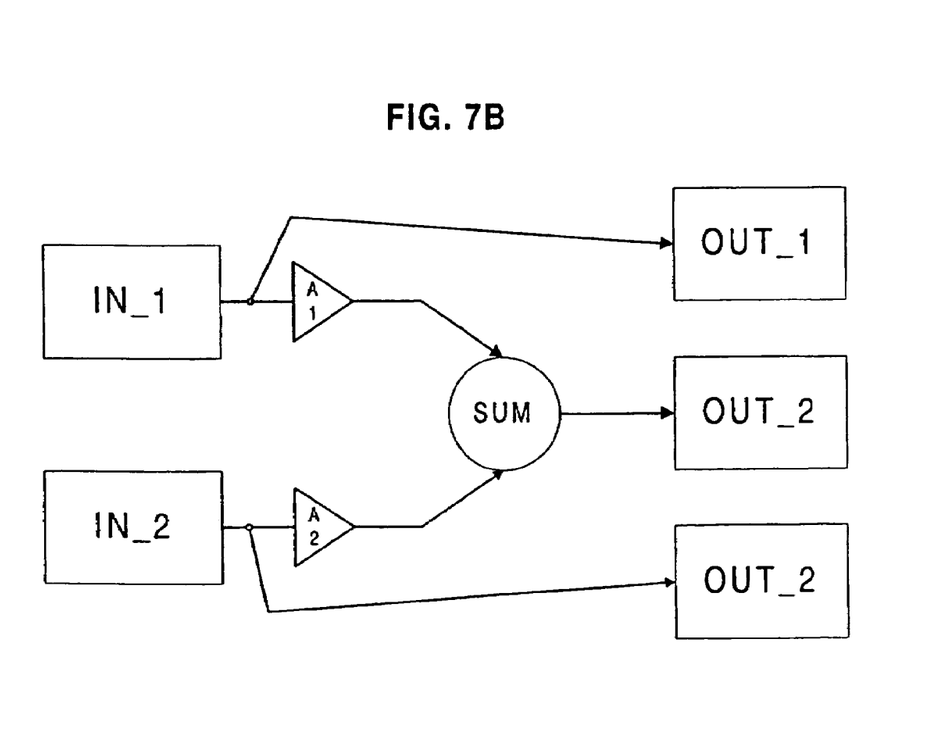
FIG. 7B shows a schematic block diagram for filtering samples in case the data stream of samples is to be expanded in the number of samples.

FIGS. 7A and 7B show examples of FIR filters which may be implemented for sample rate conversion. Those filters are simple filter examples chosen for the purpose of explanation. Better results can be obtained by using other filter coefficients as those given below and also by effecting filtering over a longer series of data samples (e.g. 10 samples input are filtered to 9 or 11 samples output).

FIG. 7A shows a FIR type filter which generates two output samples (filtered samples) OUT_1, OUT_2 out of three input samples IN_1, IN_2, IN_3. Input samples are first scaled with selected coefficients using a scaling means A1, A2, A3 and then two respective scaled samples (IN_1*A1, IN_2*A2; IN_2*A2, IN_3*A3) are added using a respective summing means SUM and output as output samples OUT_1, OUT_2, respectively.

The block diagram depicted in FIG. 7A may be expressed by the following equations:

$$OUT\_1=A1*IN\_1+A2*IN\_2$$

$$OUT\_2=A2*IN\_2+A3*IN\_3$$

with example values for the coefficients Ai (i=1,2,3) of the filter may be given as A1=0.7, A2=0.3, and A3=0.7.

This filtering can be adopted when one sample has to be removed from the data stream of input samples, and replaces three input samples by two output samples, thereby effectively shortening the sample stream by one sample.

FIG. 7B shows a FIR filtering structure using two input samples IN_1, IN_2 to obtain three output samples OUT_1, OUT_2, OUT_3 therefrom. This filtering method generates a new sample to be inserted into the data stream to thereby expand the data stream. Similar to FIG. 7A, means denoted by A1, A2 and SUM represent scaling means and summing means, respectively.

The block diagram depicted in FIG. 7B may be expressed by the following equations:

$$OUT\_1=IN\_1$$

$$OUT\_2=A1*IN\_1+A2*IN\_2$$

$$OUT\_3=IN\_3$$

with example values for the coefficients Ai (i=1,2) of the filter may be given as A1=0.5, A2=0.5.

In a specific example in which the present invention may be implemented, a situation of uplink communication from a base transceiver station BTS to a mobile switching center MSC according to GSM standard as an example for a telecommunication system is briefly described in the following.

According to GSM, so called TRAU frames are transmitted from a base transceiver station BTS through an ATM network to a transcoder (located in the base station controller BSC or mobile switching center MSC). A TRAU frame according to GSM is a standard frame for storing compressed speech and some other information. In full rate speech coding according to GSM (13 kBit/s) one TRAU frame includes data for 20 ms speech. Further, in case the speech data being RPE-LTP coded (Regular Pulse Excited-Long Term Predicted), 160 data samples are present within these 20 ms. These 160 data samples (PCM samples) of 20 ms of speech are obtained by decoding one GSM speech frame at the transcoder side. Such a block of 160 samples within 20 ms corresponds to an ATM cell transmitted via an ATM link.

The decoded speech data are normally passed through the sample rate converter SRC to the buffer without modifications as to the sample rate. However, as described above, if the buffer starts to get filled and the "full" state is being detected, the sample rate converter SRC is turned on to reduce the 160 PCM sample block to 159 samples. On the other hand, if the buffer tends to become empty and the "empty state" is accordingly detected, then the group of 160 PCM samples is expanded to 161 samples by adding a sample.

The above described principle of filtering by adding/removing a respective sample in case of possible underflow/overflow of the buffer works quite well. However, if this filtering has to be performed quite often (several times per minute) clocking noise in the signals, i.e. in the audio signals may be caused.

Nevertheless, with a slight modification of the above described first embodiment, also the audible effect of the adopted resampling methods can be reduced.

Figure 6:
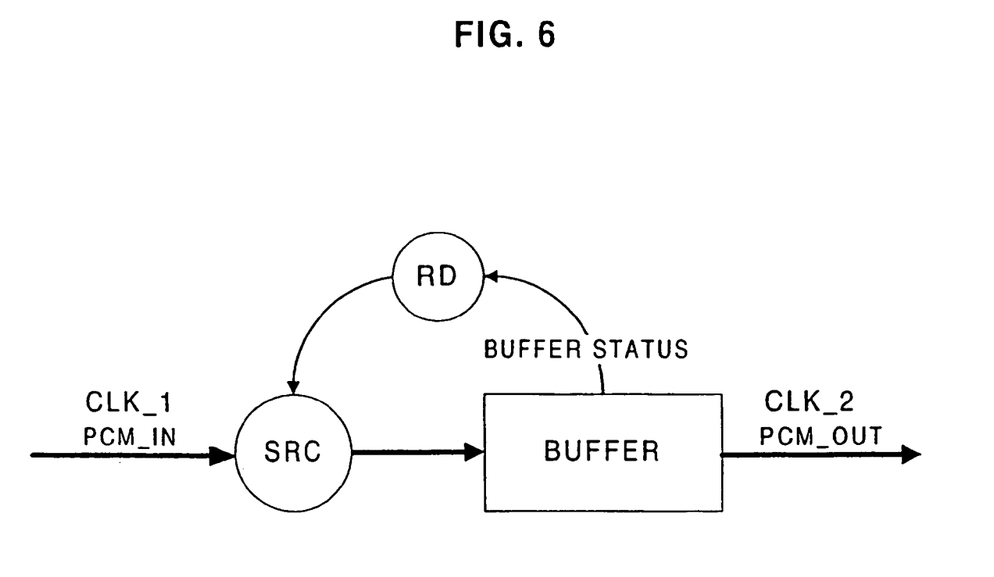
FIG. 6 illustrates a modified schematic block diagram of an arrangement according to a second embodiment of the present invention.

FIG. 6 shows the corresponding second embodiment of the present invention. Due to the similarity with the first embodiment, only those parts of the second embodiment differing from the first embodiment will be described.

In particular, according to the second embodiment, the feedback control loop for control of the sample rate converter SRC based on the detected buffer status has been modified. That is, a means RD adapted to cause random delay has been inserted in the feedback loop in order to ensure that the filtering does not occur repeatedly at a constant rate, to thereby reduce the audibility of the filtering. Such a randomizing changes the nature of the noise to a less annoying wideband impulse noise.

With regard to the specific example described above, it has to be noted that randomizing of the resampling time has to be used if the resampling is done for many subsequent groups of 160 PCM samples. Without randomizing, a 50 Hz wideband noise would occur in the sound obtained from the transmitted PCM audio data. The audibility of the filtering can be reduced by assuring that the filtering does not occur at exactly a constant rate by adding a random delay means RD causing random delay to the process. In particular, in the specific case described with reference to GSM standard where blocks of 160 samples each are handled, it is easy to use a random number from 1 to 159 to select the position within the group of data (within an ATM cell) where a sample is to be added or to be removed, according to the detected buffer state, using the filtering. That is, the value of the random number is used to determine how many samples are passed through the sample rate converter until the sample rate conversion is initiated. As a result of such randomizing, the nature of the noise is changed to a less annoying wideband impulse noise.

It should be understood that the above description and accompanying figures are only intended to illustrate the present invention by way of example only. The method according to the present invention may, however, also be used in systems other than the described GSM system. In particular, the methods used for signal adaptation and buffer underflow/overflow prevention can also be used separately as fail-safe methods for other synchronizing methods to avoid buffering problems. The preferred embodiments of the method may thus vary within the scope of the attached claims.

The invention claimed is:

1. A method for synchronization adaptation of asynchronous digital data streams comprising the steps of:
   providing a first digital data stream at a first sample rate;
   inputting said first digital data stream to a sample rate conversion means;
   supplying data output from said sample rate conversion means to a processing element;
   storing said supplied data into said processing element; and
   outputting said data stored in said processing element as a second digital data stream at a second sample rate, with said first and said second sample rates being different from each other;
   detecting a state of said processing element;
   controlling said sample rate conversion means dependent on the detected state of said processing element; and
   reducing and/or increasing a number of data samples contained in the data output by said sample rate conversion means and supplied to said processing means is randomized in time within the data stream, such that a position within a group where a sample is to be removed and/or to be added is randomly selected.

2. A method for synchronization adaptation of asynchronous digital data streams according to claim 1, wherein
   said state of said processing element represents the amount of data currently stored in said processing element.

3. A method for synchronization adaptation of asynchronous digital data streams comprising the steps of:
   providing a first digital data stream at a first sample rate;
   inputting said first digital data stream to a sample rate conversion means;
   supplying data output from said sample rate conversion means to a processing element;
   storing said supplied data into said processing element;
   outputting said data stored in said processing element as a second digital data stream at a second sample rate, with said first and said second sample rates being different from each other;
   detecting a state of said processing element said state of said processing element represents the amount of data currently stored in said processing element;
   controlling said sample rate conversion means dependent on the detected state of said processing element;
   comparing a current amount of data stored in said processing element with a lower limit and an upper limit of respective admissible data amounts stored in said processing element; and
   setting said state of said process element to a first value in case the detected actual amount of stored data exceeds the upper limit, to a second value in case the detected actual amount of stored data is below the lower limit, and to a third value in case the detected actual amount of stored data is found to be between the lower limit and the upper limit.

4. A method for synchronization adaptation of asynchronous digital data streams according to claim 3, wherein said controlling step controls said sample rate conversion means to be enabled if said detected state has said first value or said second value, and to be disabled if said detected state has said third value.

5. A method for synchronization adaptation of asynchronous digital data streams according to claim 3, wherein said controlling step comprises the steps of:

reducing the number of data samples contained in the data output by said sample rate conversion means and supplied to said processing means if said state has said first value, increasing the number of data samples contained in the data output by said sample rate conversion means and supplied to said processing means if said state has said second value, and leaving the number of data samples contained in the data output by said sample rate conversion means and supplied to said processing means unchanged if said state has said third value.

6. A device for synchronization adaptation of asynchronous digital data stream, comprising:

a sample rate conversion means to which is input a first digital data stream at a first sample rate;

a processing element for storing data output from said sample rate conversion means, and for outputting said data stored in said processing element as a second digital data stream at a second sample rate, with said first and said second sample rates being different from each other;

a detection means for detecting a state of said processing element;

a control means for controlling said sample rate conversion means dependent on the detected state of said processing element; and means for reducing and/or increasing a number of data samples contained in the data output by said sample rate conversion means and supplied to said processing means is randomized in time within the data stream, such that a position within a group where a sample is to be removed and/or to be added is randomly selected.

* * * * *